(12) United States Patent
Snook

(10) Patent No.: US 7,708,516 B1
(45) Date of Patent: *May 4, 2010

(54) WHEEL LIFT SYSTEM

(75) Inventor: Jonathan D. Snook, Southlake, TX (US)

(73) Assignee: Wheelfloat, Inc., Southlake, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/385,588

(22) Filed: Mar. 20, 2006

Related U.S. Application Data

(63) Continuation-in-part of application No. 10/877,559, filed on Jun. 25, 2004, now Pat. No. 7,207,764.

(51) Int. Cl.
*B65G 7/04* (2006.01)

(52) U.S. Cl. .................. 414/427; 254/122; 187/211

(58) Field of Classification Search ......... 414/426–429, 414/911, 458; 187/211; 211/20–21; 254/120, 254/122; 29/273; 7/100; 294/118; 280/639, 280/651, 79.4, 43.12

See application file for complete search history.

(56) References Cited

U.S. PATENT DOCUMENTS

| | | | | |
|---|---|---|---|---|
| 2,326,684 A | * | 8/1943 | Ross | 414/427 |
| 2,364,918 A | * | 12/1944 | Roberson | 414/427 |
| 2,429,723 A | * | 10/1947 | Kelley | 280/43.16 |
| 2,543,298 A | * | 2/1951 | Owens | 223/72 |
| 2,570,587 A | | 10/1951 | Noone | |
| 2,725,997 A | * | 12/1955 | Shvetz | 414/427 |
| 3,080,066 A | * | 3/1963 | Berridge et al. | 108/136 |
| 3,433,500 A | * | 3/1969 | Christensen | 280/79.2 |
| 3,976,212 A | | 8/1976 | Sanchez | |
| 3,987,915 A | * | 10/1976 | Conner | 414/807 |
| 4,460,306 A | * | 7/1984 | Hawkins | 414/427 |
| 4,530,536 A | * | 7/1985 | Williams | 294/118 |
| 4,586,696 A | * | 5/1986 | Mugford et al. | 254/122 |

(Continued)

FOREIGN PATENT DOCUMENTS

CA 2124968 A * 12/1995

(Continued)

OTHER PUBLICATIONS

Patent Cooperation Treaty, International Search Report &Written Opinion of the International Searching Authority, Aug. 21, 2008, PCT/US08/59658, 9 pages.

(Continued)

*Primary Examiner*—Saúl J Rodríguez
*Assistant Examiner*—Joshua I Rudawitz
(74) *Attorney, Agent, or Firm*—Scheef & Stone, L.L.P.; Jack D. Stone, Jr.

(57) ABSTRACT

A wheel lift system for efficiently lifting and positioning a wheel and tire onto a wheel hub. The wheel lift system includes a first arm and a second arm pivotally attached to one another, a plurality of caster wheels attached to the lower portion of the arms, and a first support and a second support extending from the arms respectively for supporting a wheel and tire. A bias member is preferably attached to the arms for providing a bias force that assists in elevating the wheel and tire. Alternatively, a bias unit may be attached to the arms for providing a bias force that assists in maintaining elevation of a wheel and tire.

21 Claims, 17 Drawing Sheets

U.S. PATENT DOCUMENTS

| | | | |
|---|---|---|---|
| 4,597,711 A | | 7/1986 | Liebermann |
| 4,724,930 A | * | 2/1988 | VanLierop .................. 187/204 |
| 4,801,152 A | * | 1/1989 | Elliott et al. ............. 280/47.34 |
| 4,872,694 A | | 10/1989 | Griesinger |
| 5,074,608 A | * | 12/1991 | Gabriel .................... 294/82.32 |
| 5,180,141 A | | 1/1993 | Hunt |
| 5,314,288 A | | 5/1994 | Schmidt |
| 5,348,438 A | | 9/1994 | Roberts |
| 5,464,314 A | | 11/1995 | Laaksonen |
| 5,562,389 A | | 10/1996 | Mitchell |
| 5,581,866 A | | 12/1996 | Barkus |
| 5,664,898 A | | 9/1997 | Ferrari et al. |
| 5,709,520 A | | 1/1998 | Pish |
| 5,722,513 A | * | 3/1998 | Rowan et al. ............... 187/269 |
| 5,855,359 A | * | 1/1999 | Chipperfield ................ 254/88 |
| 5,886,258 A | | 3/1999 | Maioli et al. |
| 5,897,171 A | | 4/1999 | Seifert |
| 5,984,410 A | * | 11/1999 | Brodersen .................. 297/339 |
| 6,074,118 A | | 6/2000 | Ferrari et al. |
| 6,095,745 A | | 8/2000 | Garnett |
| 6,106,214 A | | 8/2000 | Saffelle et al. |
| 6,131,293 A | | 10/2000 | Maioli et al. |
| 6,152,505 A | * | 11/2000 | Coyne ........................ 294/16 |
| 6,237,206 B1 | | 5/2001 | Bezemer et al. |
| 6,276,732 B1 | * | 8/2001 | Hauss ......................... 294/16 |
| 6,298,535 B1 | | 10/2001 | Lower |
| 6,527,321 B1 | * | 3/2003 | Kuciauskas .................... 294/3 |
| 6,719,521 B1 | * | 4/2004 | Van Boxtel ................. 414/490 |
| 6,929,442 B2 | | 8/2005 | Ferrari et al. |
| 7,207,764 B1 | * | 4/2007 | Snook ....................... 414/427 |

FOREIGN PATENT DOCUMENTS

| | | | | |
|---|---|---|---|---|
| FR | 2749838 A | * | 12/1997 |
| JP | 08318703 A | * | 12/1996 |
| JP | 09267607 A | * | 10/1997 |

OTHER PUBLICATIONS

Web Page: http://www.norcoind.com/norco/whdoll.htm, "Wheel Dollies", Norco Industries, Jun. 9, 2004.

Web Page: http://www.jackxchange.com/products/82302B.cfm; "Wheels Dollies"; Jack-x-change; Jun. 9, 2004.

Web Page: http://www.alltiresupply.com/Merchant2/merchant.mv?Screen=PROD&Store_Code=MD..; "Lincoln 3/4 Ton Hydraulic Wheel Dolly"; All Tire Supply Co.; May 26, 2004.

Web Page: http://www.alltiresupply.com/Merchant2/merchant.mv...1AK810C1&Product_Code=ESC-70130& Category_Code=M_WD; "ESCO Truck Wheel Dolly"; All Tire Supply Co.; May 26, 2004.

Web Page: http://www.rotarylift.com; "Productivity Tools and Equipment: Battery Powered Mobile Wheel Lift"; Rotary, A Dover Company, Madison, Indiana.

Web Page: http://www.alltiresupply.com/Merchant2/merchant.mv?Screen=PROD&Store_Code=MD...; AME-47050/Omega 3/4 Ton Capacity Wheel Dolly; All Tire Supply Co., May 26, 2004.

Web Page: http://www.agequipment.co.uk/wheel_lift; "Craftsman Commercial Wheel Lift"; Automotive Garage Equipment; May 26, 2004.

* cited by examiner

WHEEL LIFT SYSTEM

CROSS REFERENCE TO RELATED APPLICATIONS

I hereby claim benefit under Title 35, United States Code, Section 120 of U.S. patent application Ser. No. 10/877,559 (now U.S. Pat. No. 7,207,764) filed Jun. 25, 2004. This application is a continuation-in-part of the application Ser. No. 10/877,559. The application Ser. No. 10/877,559 is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to wheel lift devices and more specifically it relates to a wheel lift system for efficiently lifting and positioning a wheel and tire onto a wheel hub.

2. Description of the Related Art

Wheel lift devices have been in use for years. Conventional wheel lift devices are typically comprised of hydraulic/pneumatic bottle jack lifting system that lifts the wheel in position with respect to a wheel hub. Another method of lifting wheels into a desired position with respect to a wheel hub is by manually positioning the wheel with blocks and related objects. Further methods can be found using winches or electric motors that lift a wheel into position. Conventional wheel lift devices are relatively complex and expensive. In addition, conventional wheel lift devices are relatively cumbersome to operate.

While these devices may be suitable for the particular purpose to which they address, they are not as suitable for efficiently lifting and positioning a wheel and tire onto a wheel hub.

In these respects, the wheel lift system according to the present invention substantially departs from the conventional concepts and designs of the prior art, and in so doing provides an apparatus primarily developed for the purpose of efficiently lifting and positioning a wheel and tire onto a wheel hub.

BRIEF SUMMARY OF THE INVENTION

In view of the foregoing disadvantages inherent in the known types of wheel lift devices now present in the prior art, the present invention provides a new wheel lift system construction wherein the same can be utilized for efficiently lifting and positioning a wheel and tire onto a wheel hub.

The general purpose of the present invention, which will be described subsequently in greater detail, is to provide a new wheel lift system that has many of the advantages of the wheel lift devices mentioned heretofore and many novel features that result in a new wheel lift system which is not anticipated, rendered obvious, suggested, or even implied by any of the prior art wheel lift devices, either alone or in any combination thereof.

To attain this, the present invention generally comprises a first arm and a second arm pivotally attached to one another, a plurality of caster wheels attached to the lower portion of the arms, and a first support and a second support extending from the arms respectively for supporting a wheel and tire. A bias member is preferably attached to the arms for providing a bias force that assists in elevating the wheel and tire. Alternatively, a bias unit may be attached to the arms for providing a bias force that assists in maintaining elevation of a wheel and tire.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a wheel lift system that will overcome the shortcomings of the prior art devices.

A second object is to provide a wheel lift system for efficiently lifting and positioning a wheel and tire onto a wheel hub.

Another object is to provide a wheel lift system that is relatively inexpensive.

An additional object is to provide a wheel lift system that does not require complex control devices or motors to operate.

A further object is to provide a wheel lift system that is easily maneuverable.

Another object is to provide a wheel lift system that is relatively lightweight and compact in size.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
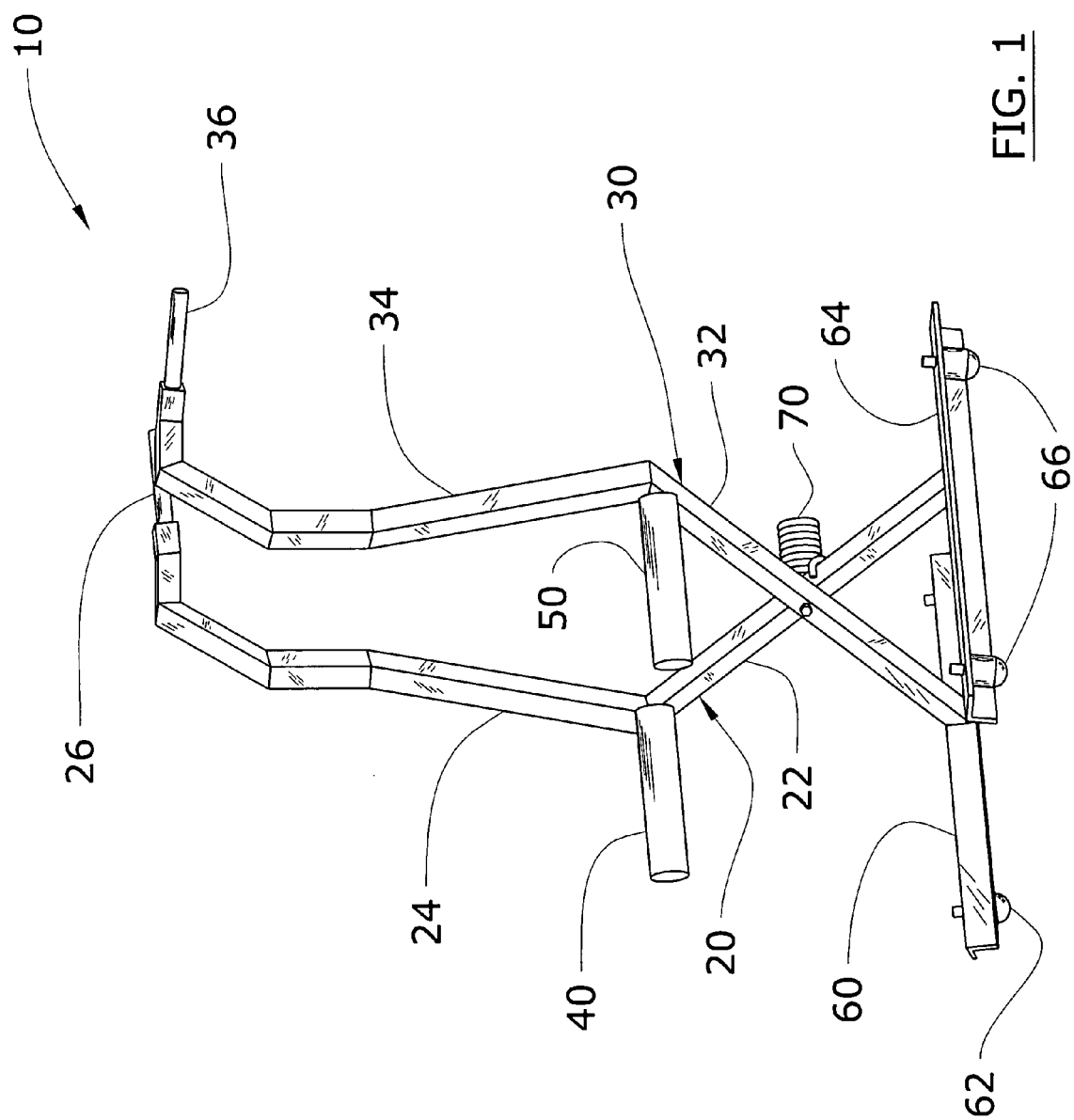
FIG. 1 is an upper perspective view of the present invention in the upright position.
Figure 2:
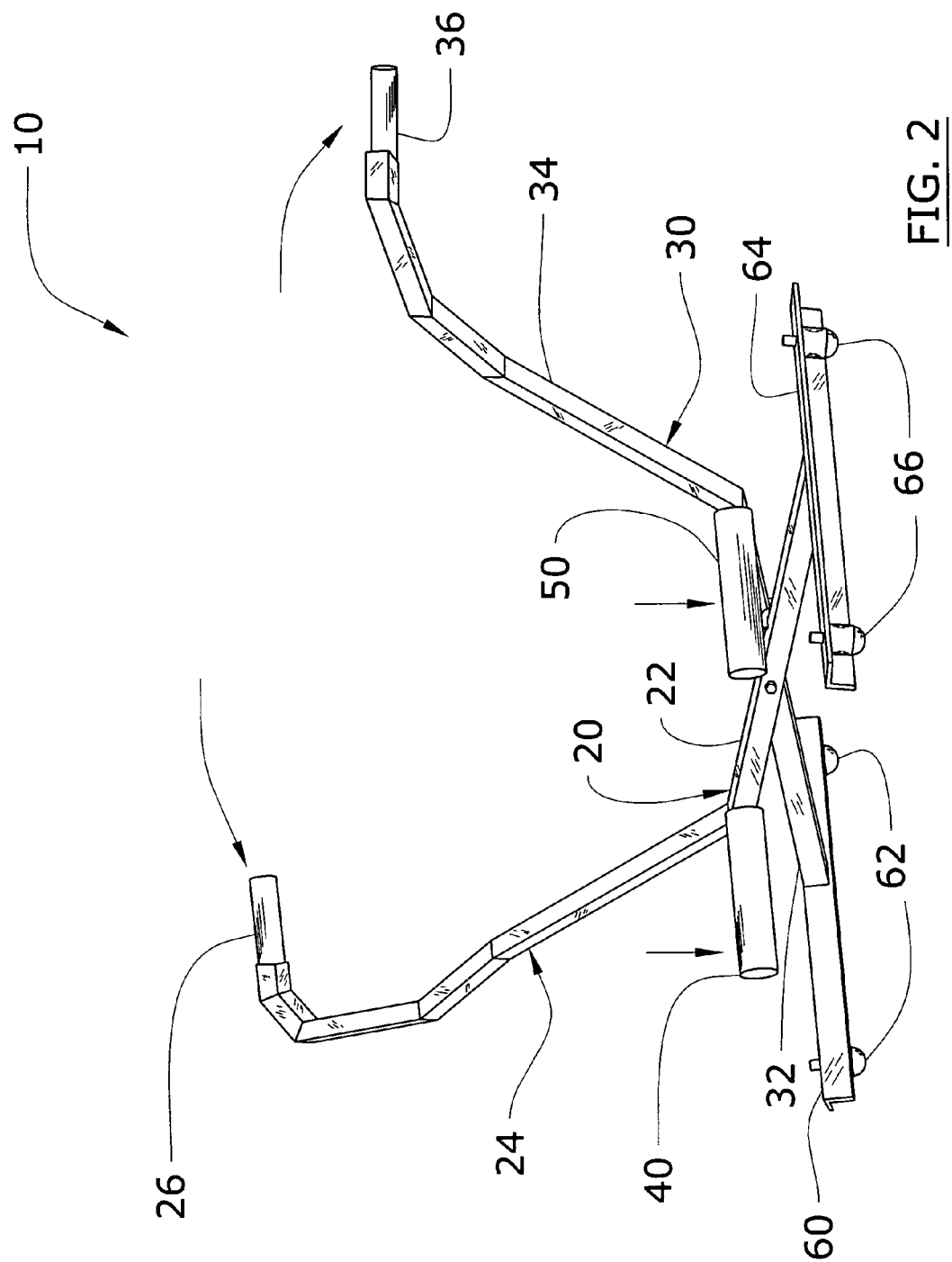
FIG. 2 is an upper perspective view of the present invention in the lowered position.

Turning now descriptively to the drawings, in which similar reference characters denote similar elements throughout the several views, FIGS. 1 through 11 illustrate a wheel lift system 10, which comprises a first arm 20 and a second arm 30 pivotally attached to one another, a plurality of wheels 62, 66 attached to the lower portion of the arms, and a first support 40 and a second support 50 extending from the arms respectively for supporting a wheel and tire 12. A bias member 70 is preferably attached to the arms for providing a bias force that assists in elevating the wheel and tire 12.

B. Arms

The first arm 20 and the second arm 30 are pivotally attached to one another at a pivot point preferably in a crossing manner forming an X-shaped structure as shown in FIGS. 4 through 11 of the drawings. The pivot point may be at various locations, however the pivot point is preferably at an equal distance from a lower end for each of the arms.

The first arm 20 is preferably comprised of a first lower segment 22 below the pivot point and a first upper segment 24 above the pivot point as shown in FIGS. 4 through 11 of the drawings. The second arm 30 is also preferably comprised of a second lower segment 32 below the pivot point and a second upper segment 34 above the pivot point that mirrors the structure of the first arm 20.

Figure 3:
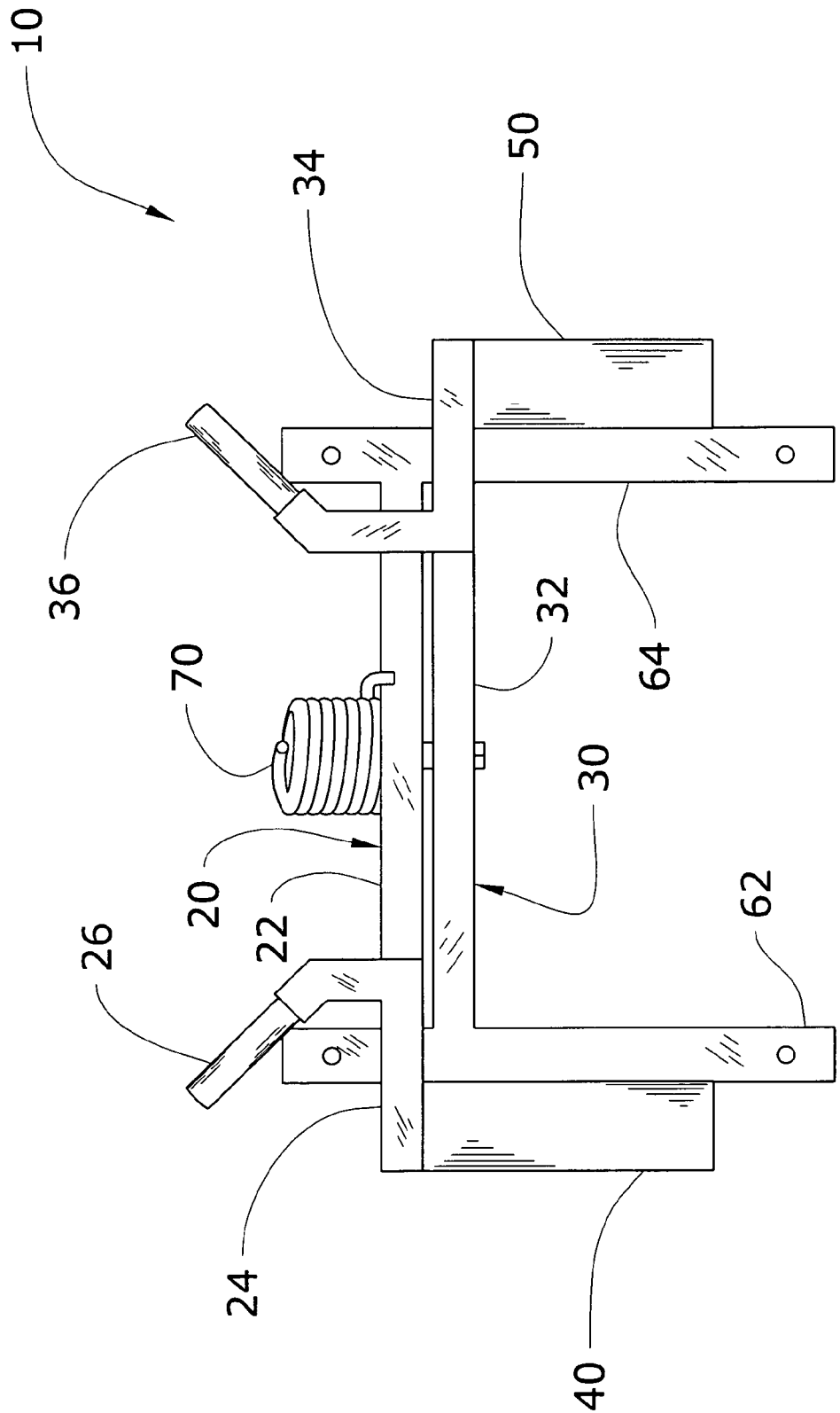
FIG. 3 is a top view of the present invention.

A first handle 26 extends from the first upper segment 24 of the first arm 20 and a second handle 36 extends from the second upper segment 34 of the second arm 30 as shown in FIG. 3 of the drawings. The handles 26, 36 may be comprised of various structures that are easy for a user to grasp. The upper segments 24, 34 are preferably sufficiently long enough to allow the user to comfortably grasp the handles 26, 36 while fully upright in order to maneuver the device.

C. Supports

The first support 40 extends from the first arm 20 as shown in FIGS. 2 through 11 of the drawings. The second support 50 extends from the second arm 30 as further shown in the figures. The first support 40 and the second support 50 are substantially parallel to one another for supporting a tire 12 between thereof as best illustrated in FIG. 3 of the drawings.

The first support 40 and the second support 50 preferably extend substantially transversely from the first arm 20 and the second arm 30 respectively for removably supporting the tire 12 as further shown in FIG. 3 of the drawings. The supports 40, 50 may be comprised of various elongated structures such as but not limited to rollers, rod members and the like.

D. Bases

The first base 60 is attached to a lower end of the first arm 20 and the second base 64 is attached to a lower end of the second arm 30 as shown in FIGS. 1 through 11 of the drawings. The first base 60 and the second base 64 preferably extend in a direction similar to the supports 40, 50 to provide support for when a tire 12 is positioned upon the supports 40, 50 as shown in FIG. 3 of the drawings.

A plurality of first wheels 62 are attached to the first base 60 and a plurality of second wheels 66 are attached to the second base 64. The first wheels 62 and the second wheels 66 are preferably comprised of caster wheels or other wheels capable of rotating in a three-hundred-sixty degree manner.

E. Bias Member

Figure 4:
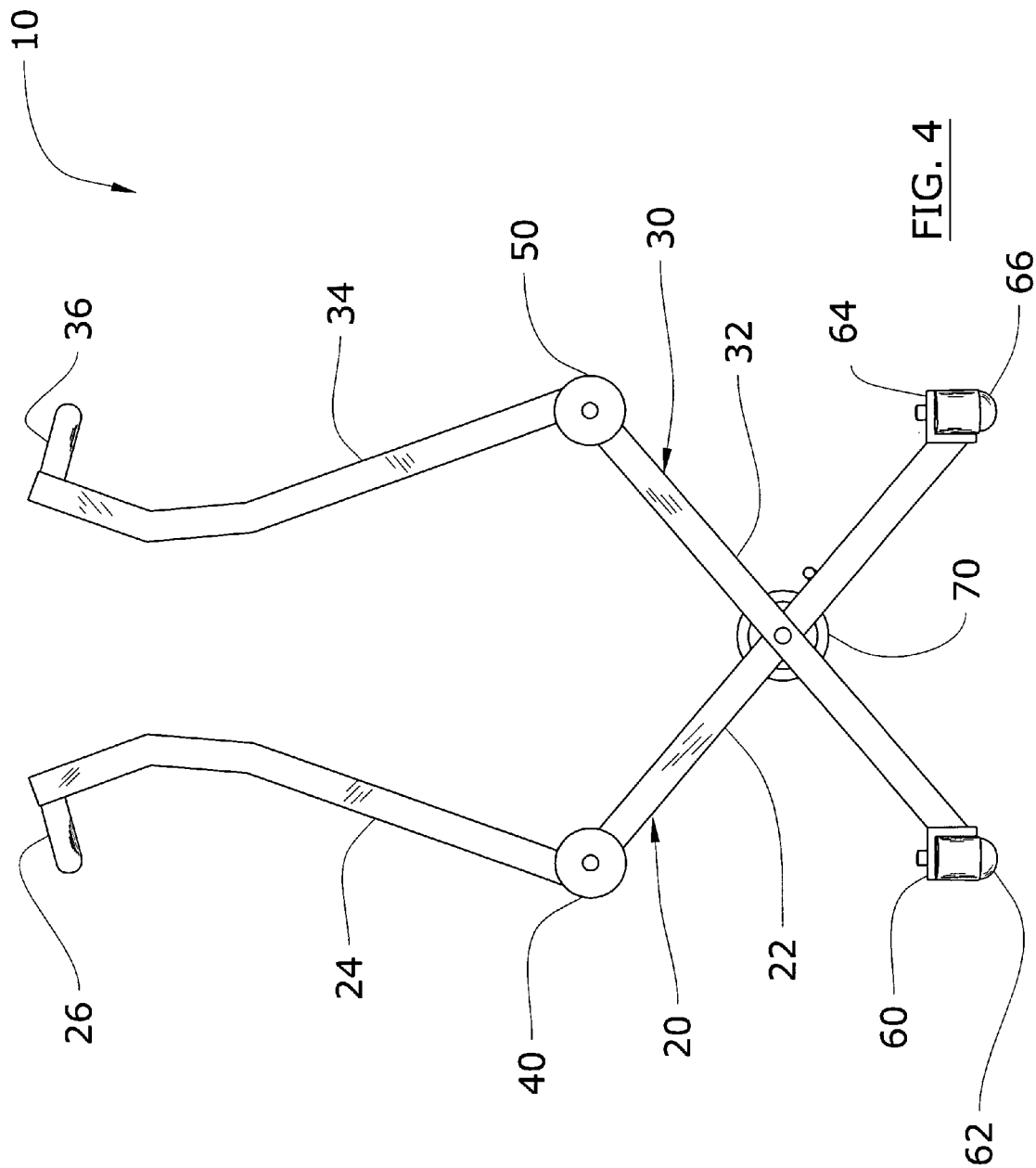
FIG. 4 is a front view of the present invention in the upright position.
Figure 7:
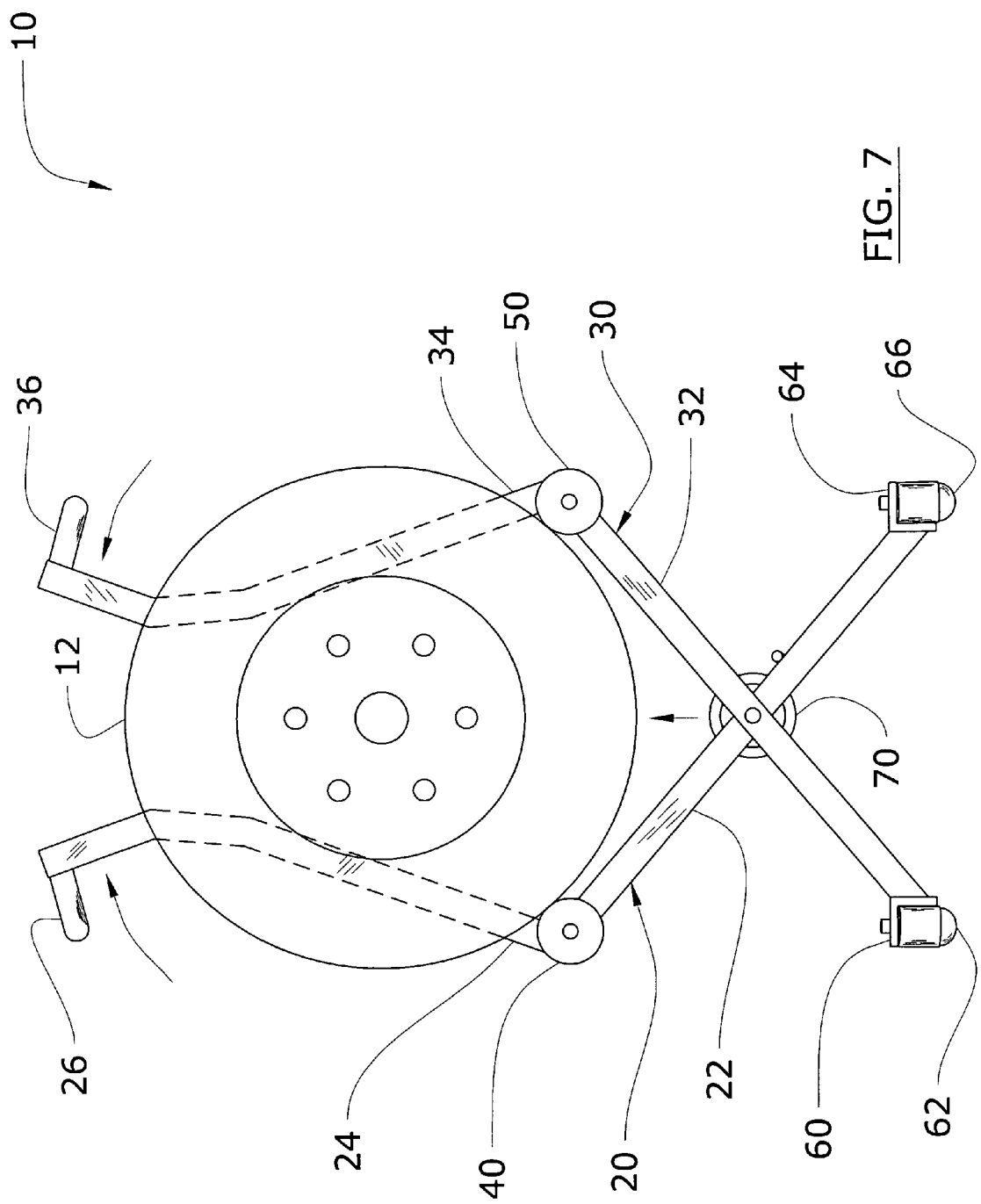
FIG. 7 is a front view of the present invention in the upright position supporting a wheel.

The bias member 70 is attached to the first arm 20 and the second arm 30 for providing a bias force that assists in elevating a wheel and tire 12 positioned upon the first support 40 and the second support 50. The bias member 70 applies a bias force that attempts to elongate the present invention in vertical manner. FIGS. 4 and 7 illustrate the present invention when in an upright position. The bias force may be capable of elevating a wheel and tire 12 positioned upon the supports 40, 50. The bias force is preferably at least capable of assisting the user to elevate the wheel and tire 12 positioned upon the supports 40, 50, though the bias force may be greater for elevating the wheel and tire 12 without requiring the physical assistance of the user.

FIGS. 1 through 7 illustrate the bias member 70 as a torsion spring wherein the bias force is comprised of a rotational force applied to the first arm 20 and the second arm 30 in opposite manners. The torsion spring is attached to both the first arm 20 and the second arm 30 thereby causing the first arm 20 to rotate in a clockingwise manner and the second arm 30 to rotate in a counter-clockingwise manner as shown in FIG. 7 of the drawings.

Figure 8:
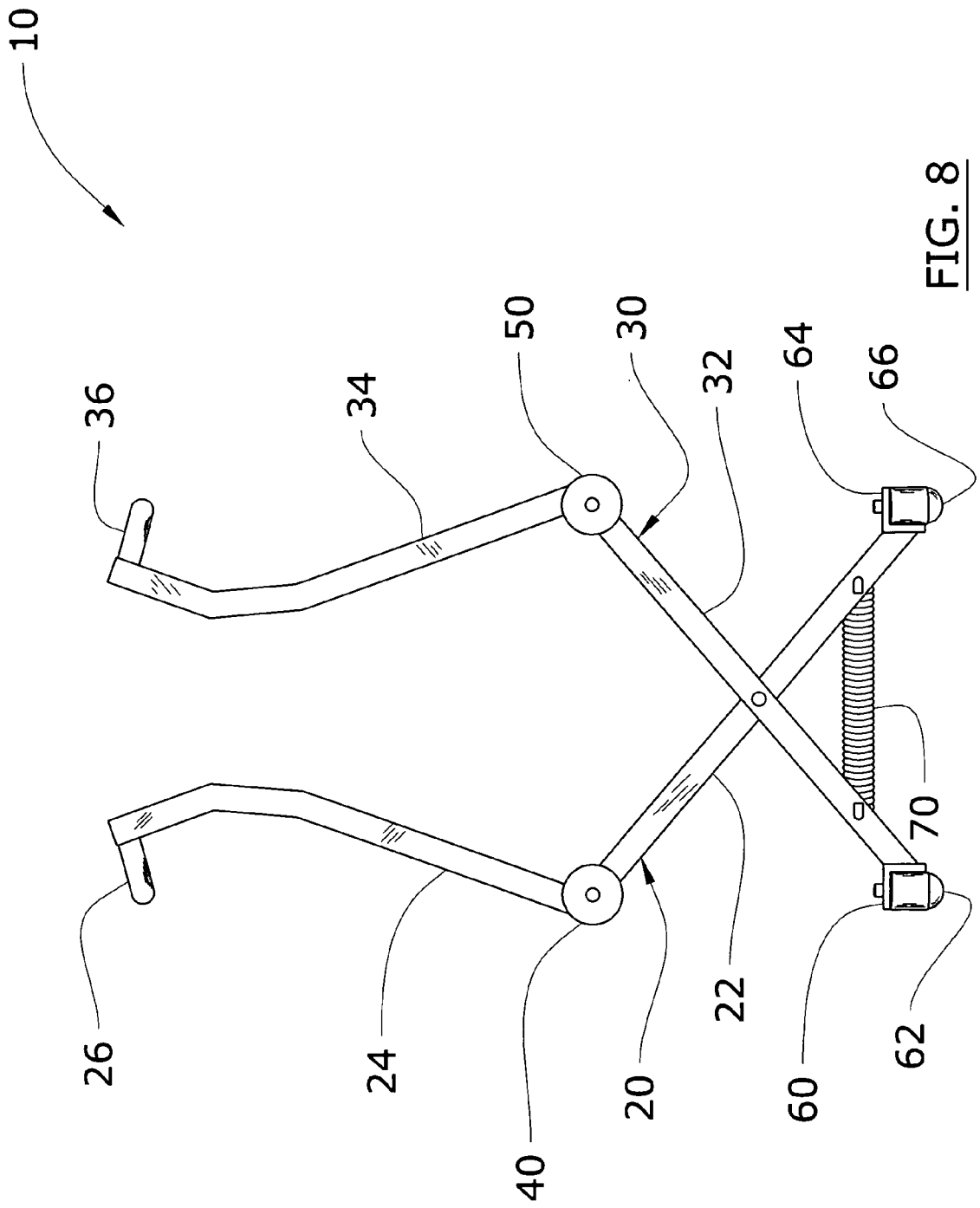
FIG. 8 is a front view of a first alternative embodiment of the present invention.
Figure 9:
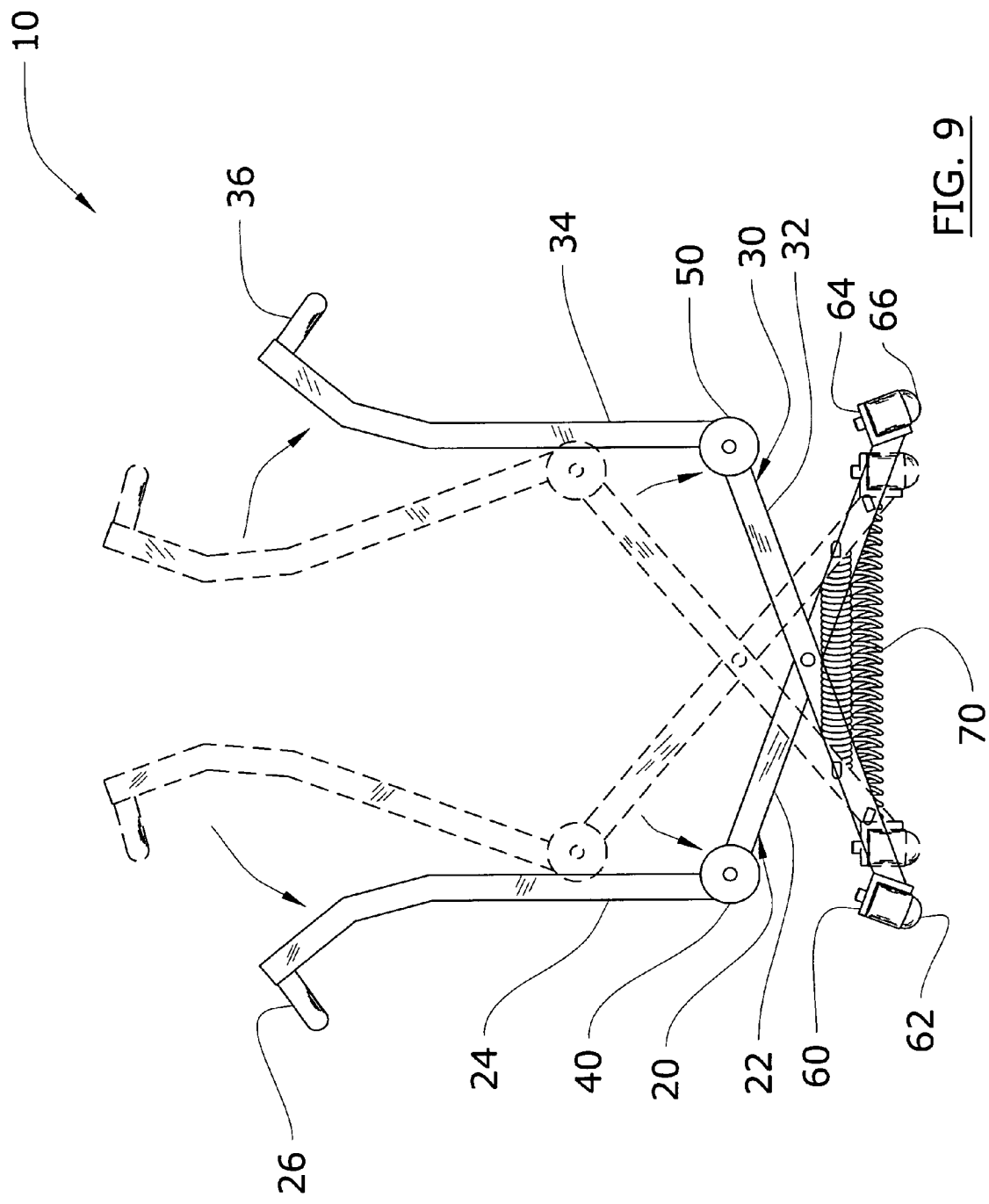
FIG. 9 is a front view of the first alternative embodiment of the present invention in the lowered position.
Figure 10:
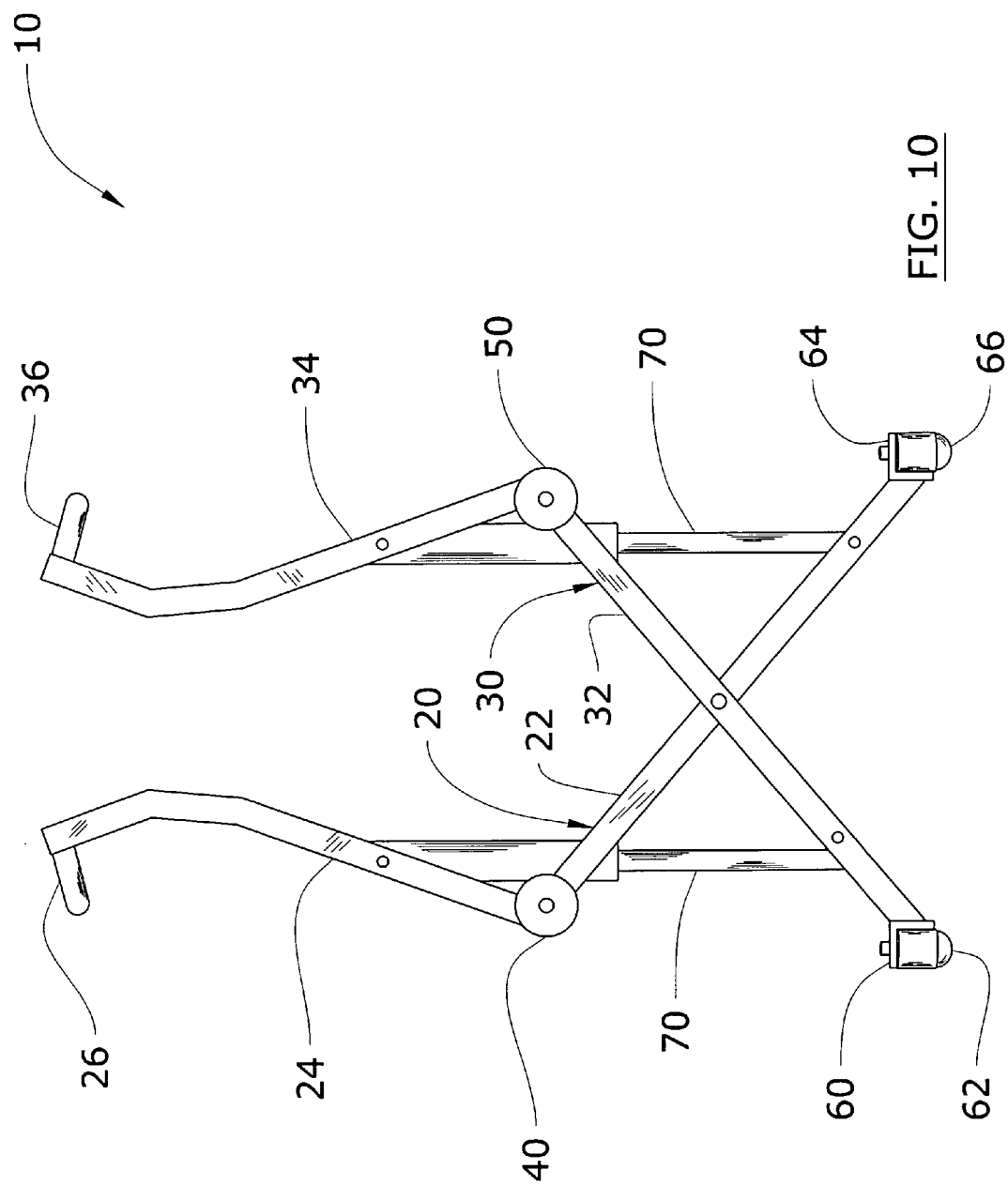
FIG. 10 is a front view of a second alternative embodiment of the present invention.
Figure 11:
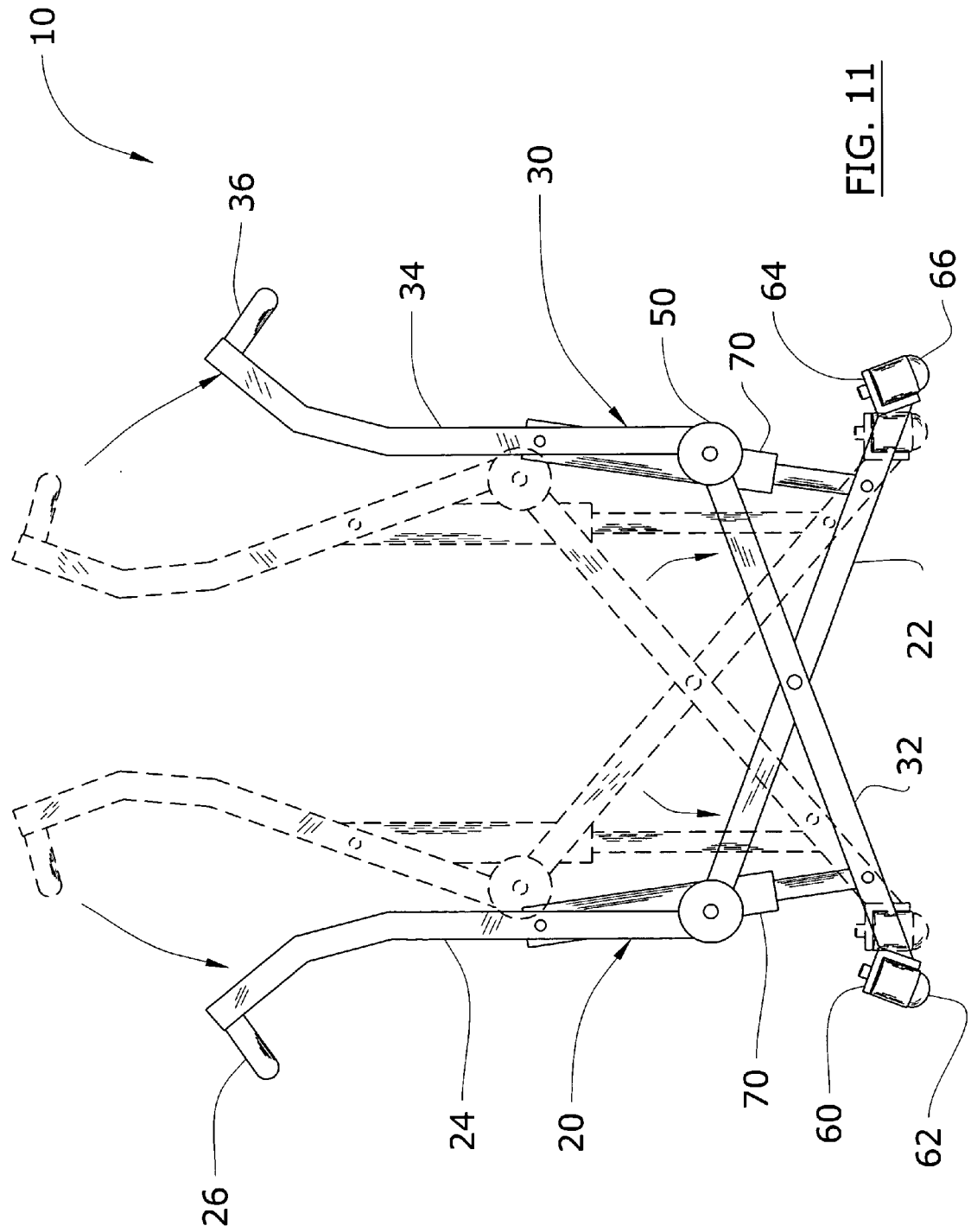
FIG. 11 is a front view of the second alternative embodiment of the present invention in the lowered position.

FIGS. 8 and 9 illustrate the bias member 70 as a spring (or other elongated member capable of being stretched) extending between the lower portions of the first arm 20 and the second arm 30 for drawing the respective lower portions of the arms 20, 30. FIGS. 10 and 11 illustrate the bias member 70 as an actuator connected to a lower portion of the first arm 20 and an upper portion of the second arm 30. The actuator may be comprised of a compressed gas actuator or spring actuator that is capable of applying an extending force.

F. Alternative Embodiment i. Overview

FIGS. 12 through 17 illustrate a preferred alternative embodiment of the present invention. More particularly, a wheel lift system 10, which comprises a first arm 20 and a second arm 30 pivotally attached to one another, a plurality of wheels 62, 66 attached to the lower portion of the arms, and a first support 40 and a second support 50 extending from the arms respectively for supporting a wheel and tire 12. A bias unit 74 is attached to the arms for providing a bias force that assists in elevating the wheel and tire 12.

ii. Arms

The first arm 20 and the second arm 30 are pivotally attached to one another at a pivot member 72 preferably in a crossing manner forming an X-shaped structure as shown in FIGS. 12 through 16 of the drawings. The pivot member 72 may be at various locations, however the pivot member 72 is preferably at an equal distance from a lower end for each of the arms.

The first arm 20 is preferably comprised of a first lower segment 22 below the first support 40 and a first upper segment 24 above the first support 40, as shown in FIGS. 12 through 16 of the drawings. The second arm 30 is also preferably comprised of a second lower segment 32 below the second support 50 and a second upper segment 34 above the second support 50 that mirrors the structure of the first arm 20.

Figure 12:
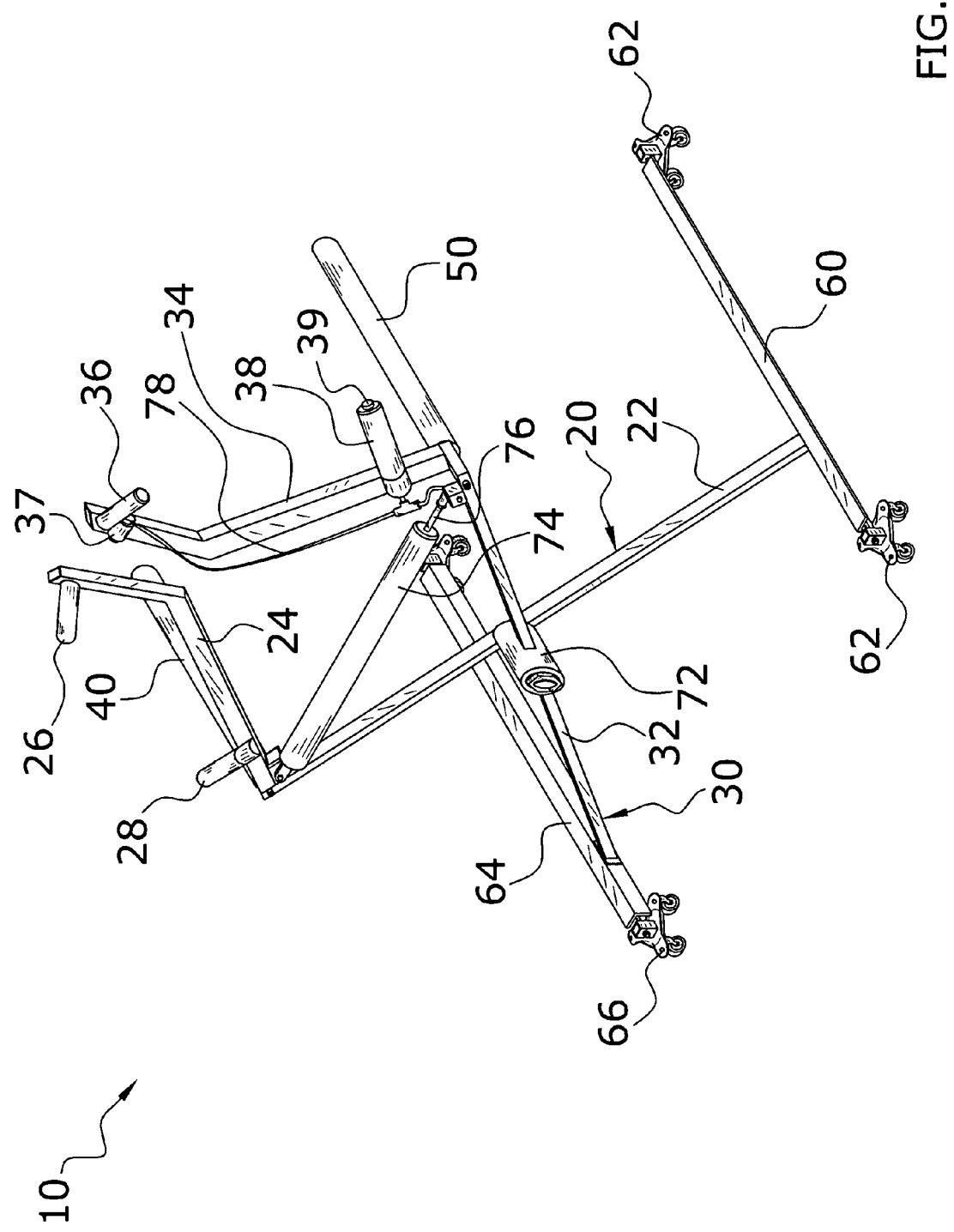
FIG. 12 is an upper perspective of an alternate embodiment of the present invention.

A first handle 26 extends from the upper portion of the first upper segment 24 of the first arm 20 and a second handle 36 extends from the upper portion of the second upper segment 34 of the second arm 30, as shown in FIG. 12 of the drawings. The handles 26, 36 may be comprised of various structures that are easy for a user to grasp. The upper segments 24, 34 are preferably sufficiently long enough to allow the user to comfortably grasp the handles 26, 36 while fully upright in order to maneuver the wheel lift system 10.

The first upper segment 24 and the second upper segment 34 also, preferably, include a first lower handle 28 and a second lower handle 38. The first lower handle 28 extends from the lower portion of the first upper segment 24 of the first arm 20 and the second lower handle 38 extends from the lower portion of the second upper segment 34 of the second arm 30, as shown in FIG. 12 of the drawings. The first lower handle 28 and the second lower handle 38 are preferably of a structure similar to the first handle 26 and the second handle 36.

iii. Supports

Figure 17:
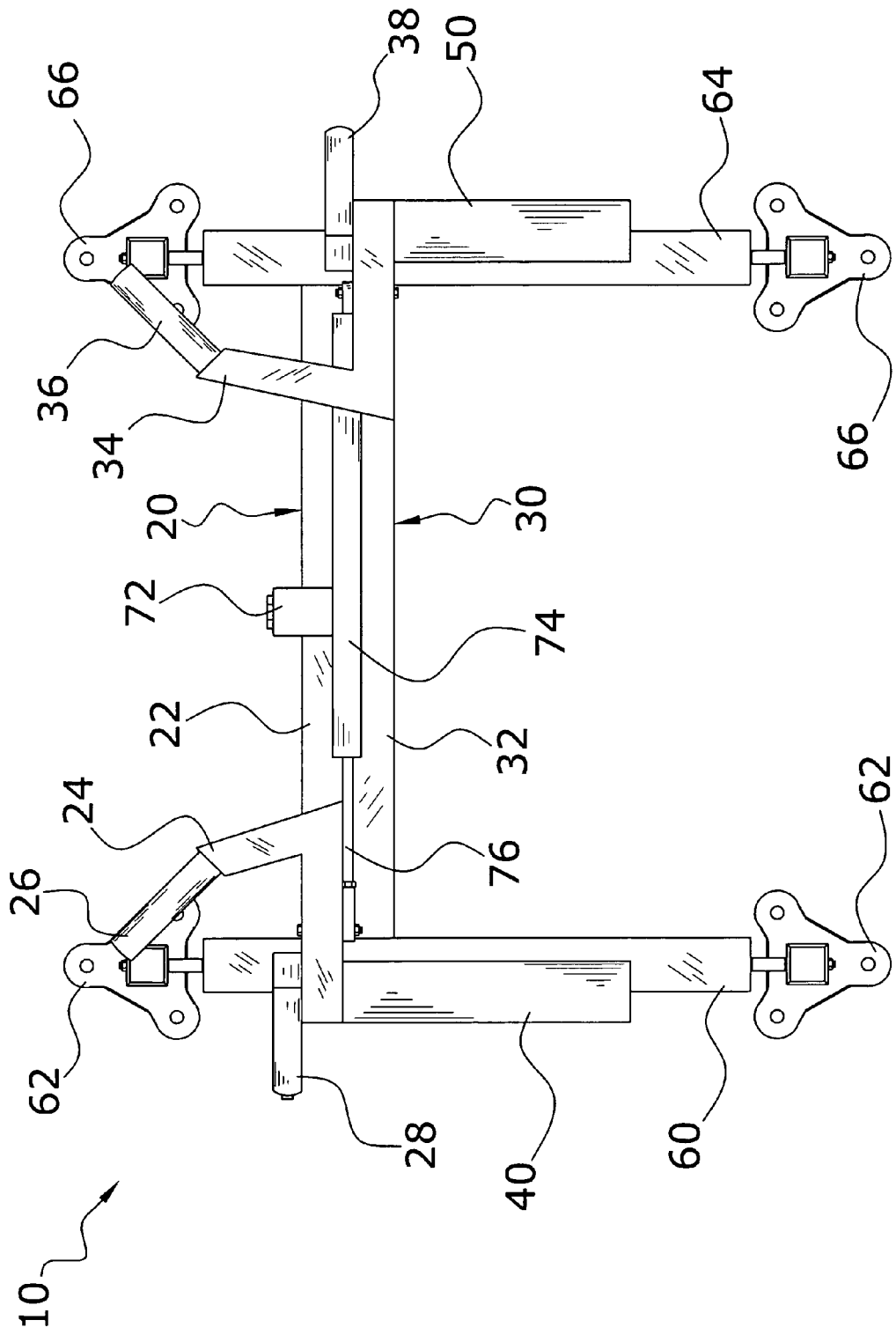
FIG. 17 is a top view of an alternate embodiment of the present invention.

The first support 40 extends from the first arm 20, as shown in FIGS. 12 and 17 of the drawings. The second support 50 extends from the second arm 30 as further shown in the figures. The first support 40 and the second support 50 are substantially parallel to one another for supporting a wheel and tire 12 between thereof, as best illustrated in FIGS. 13 through 15 of the drawings.

Figure 13:
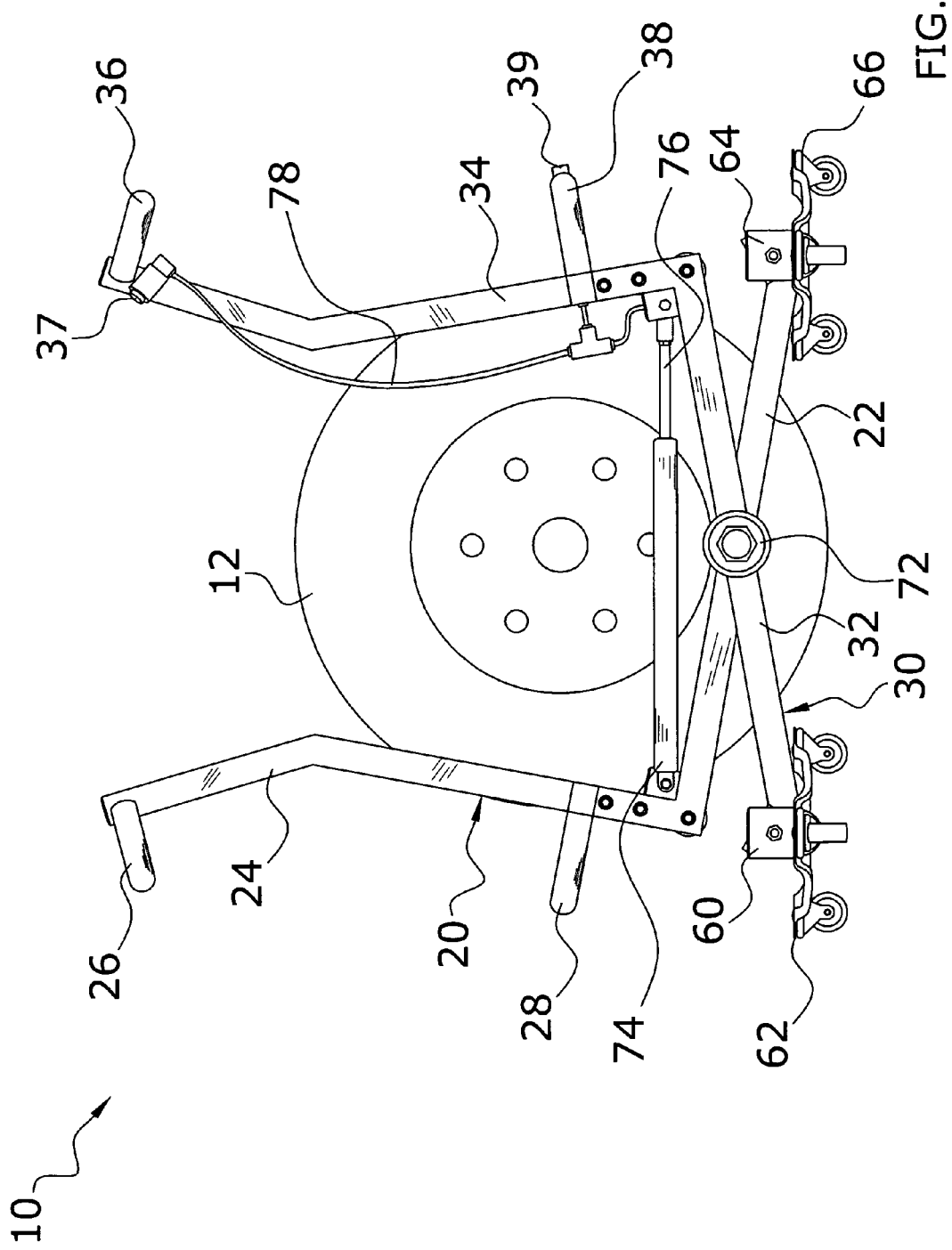
FIG. 13 is a front view of an alternate embodiment of the present invention in the lowered position supporting a wheel.
Figure 14:
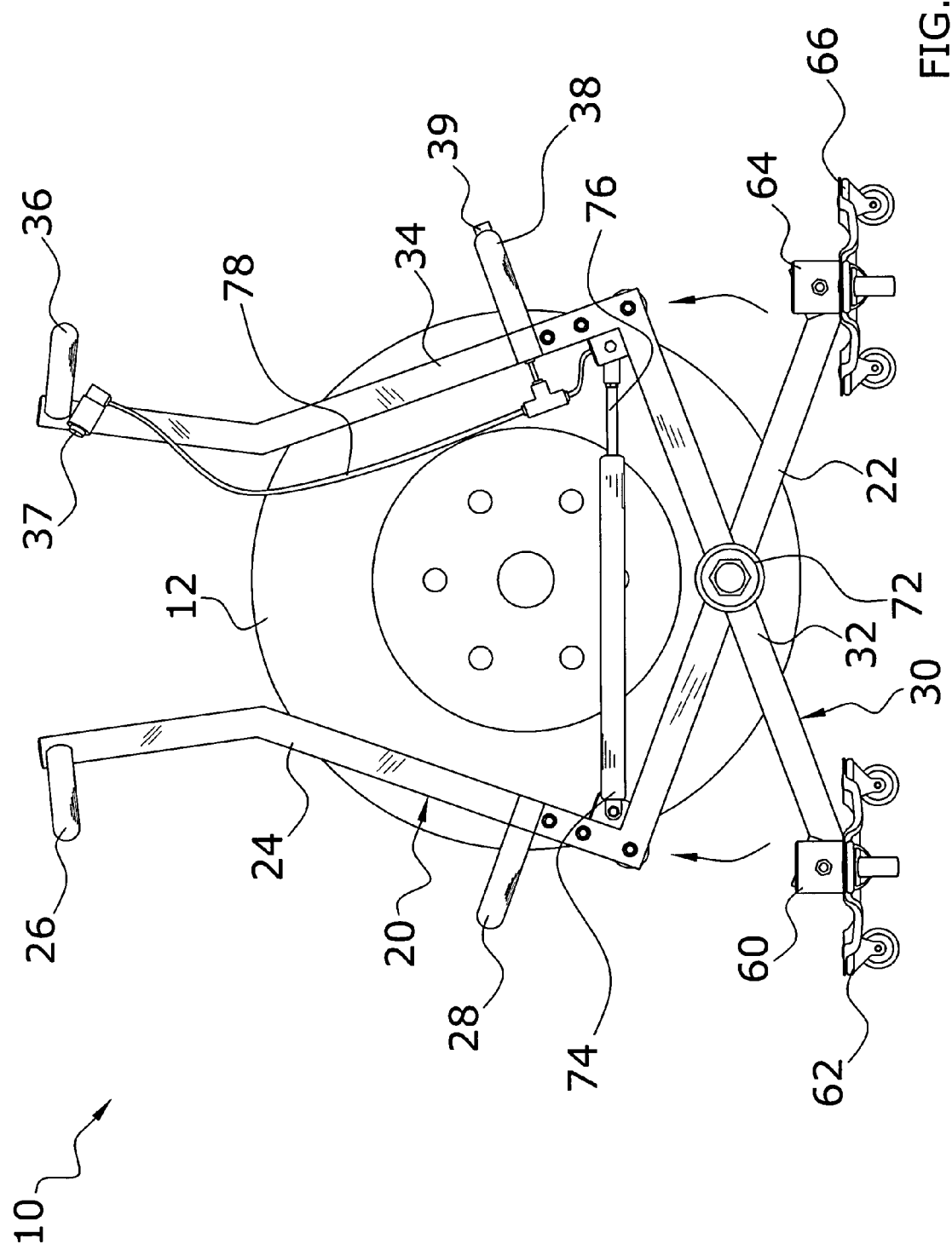
FIG. 14 is a front view of an alternate embodiment of the present invention in a halfway position supporting a wheel.
Figure 15:
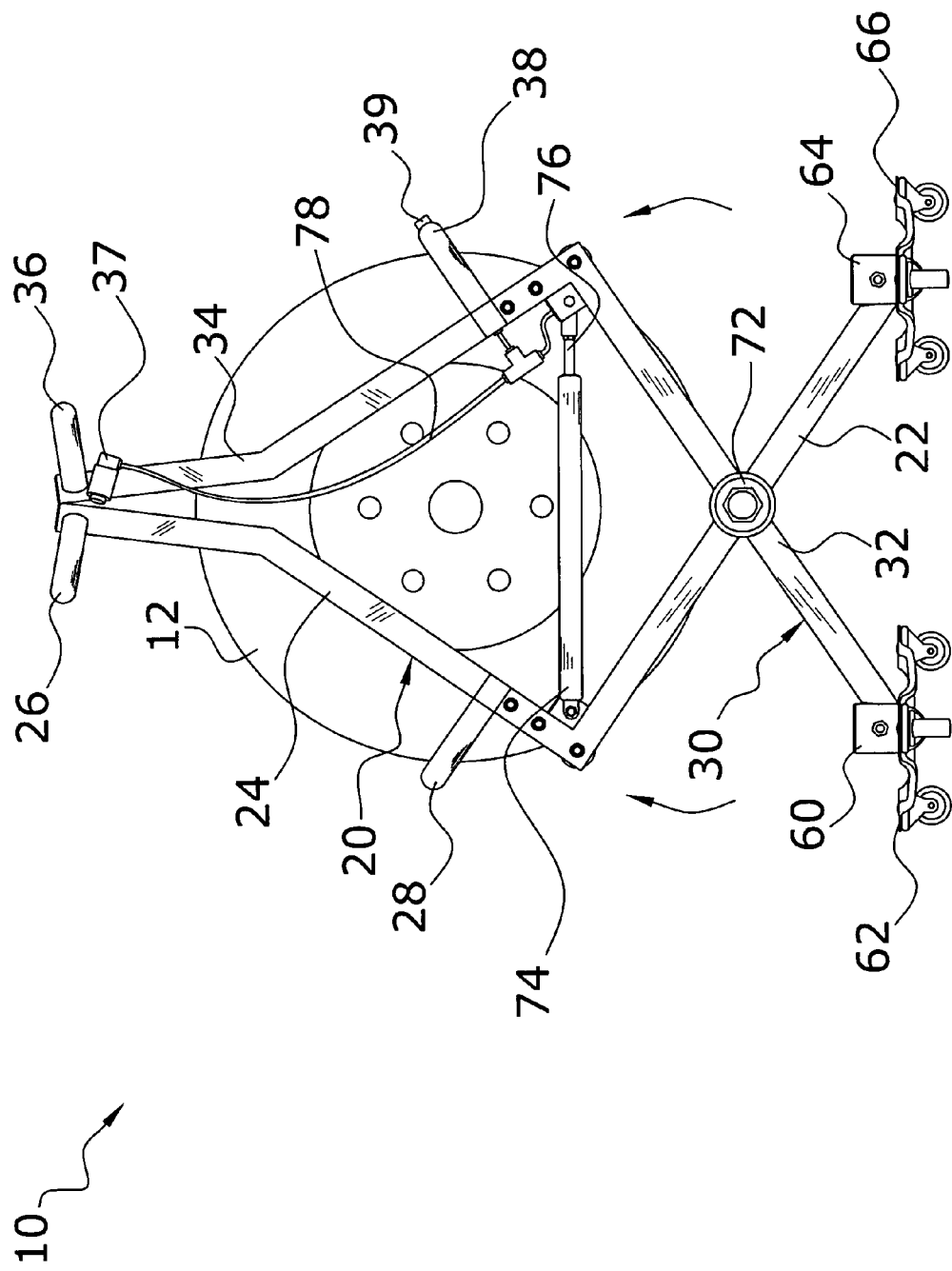
FIG. 15 is a front view of an alternate embodiment of the present invention in a fully raised position supporting a wheel.

The first support 40 and the second support 50 preferably extend substantially transversely from the first arm 20 and the second arm 30 respectively for removably supporting the wheel and tire 12, as further shown in FIGS. 13 through 15 of the drawings. The supports 40, 50 may be comprised of various elongated structures such as but not limited to rollers, rod members and the like.

iv. Bases

The first base 60 is attached to a lower end of the first arm 20 and the second base 64 is attached to a lower end of the second arm 30, as shown in FIGS. 12 through 17 of the drawings. The first base 60 and the second base 64 preferably extend in a direction similar to the supports 40, 50 to provide support for when a wheel and tire 12 are positioned upon the supports 40, 50 as shown in FIG. 17 of the drawings.

A plurality of first wheels 62 are attached to the first base 60 and a plurality of second wheels 66 are attached to the second base 64. The first wheels 62 and the second wheels 66 are preferably comprised of three caster wheel structure.

v. Bias Unit

The bias unit 74 is preferably attached to the first arm 20 on the upper portion of the first lower segment 22, as shown in FIGS. 12 through 16. The bias unit 74 includes a rod member 76 which is extendable from the bias unit 74 and is preferably attached to the second arm 30 on the upper portion of the second lower segment 32. The structure of the bias unit 74 is preferably composed of a gas spring. The gas spring is preferably a locking gas spring where the gas spring remains in a locked state unless a release member 37, 39 is activated.

The bias unit 74 is preferably attached to a hydraulic hose 78 which preferably includes a first release member 37 and a second release member 39, as shown in FIGS. 12 through 16. The first release member 37 and the second release 39 member preferably function in a similar way. When the release member 37, 39 is activated gas or oil is able to flow through the bias unit 74, allowing the rod member 76 to move out or be pushed in with expenditure of force.

The first release member 37 is preferably attached near the upper portion of the second upper segment 34, as to be easily activated while elevating the wheel lift system 10. The second release member 39 is preferably attached on the second lower handle 38, as to be activated when lowering the wheel lift system 10 and aligning a wheel and tire 12.

Figure 16:
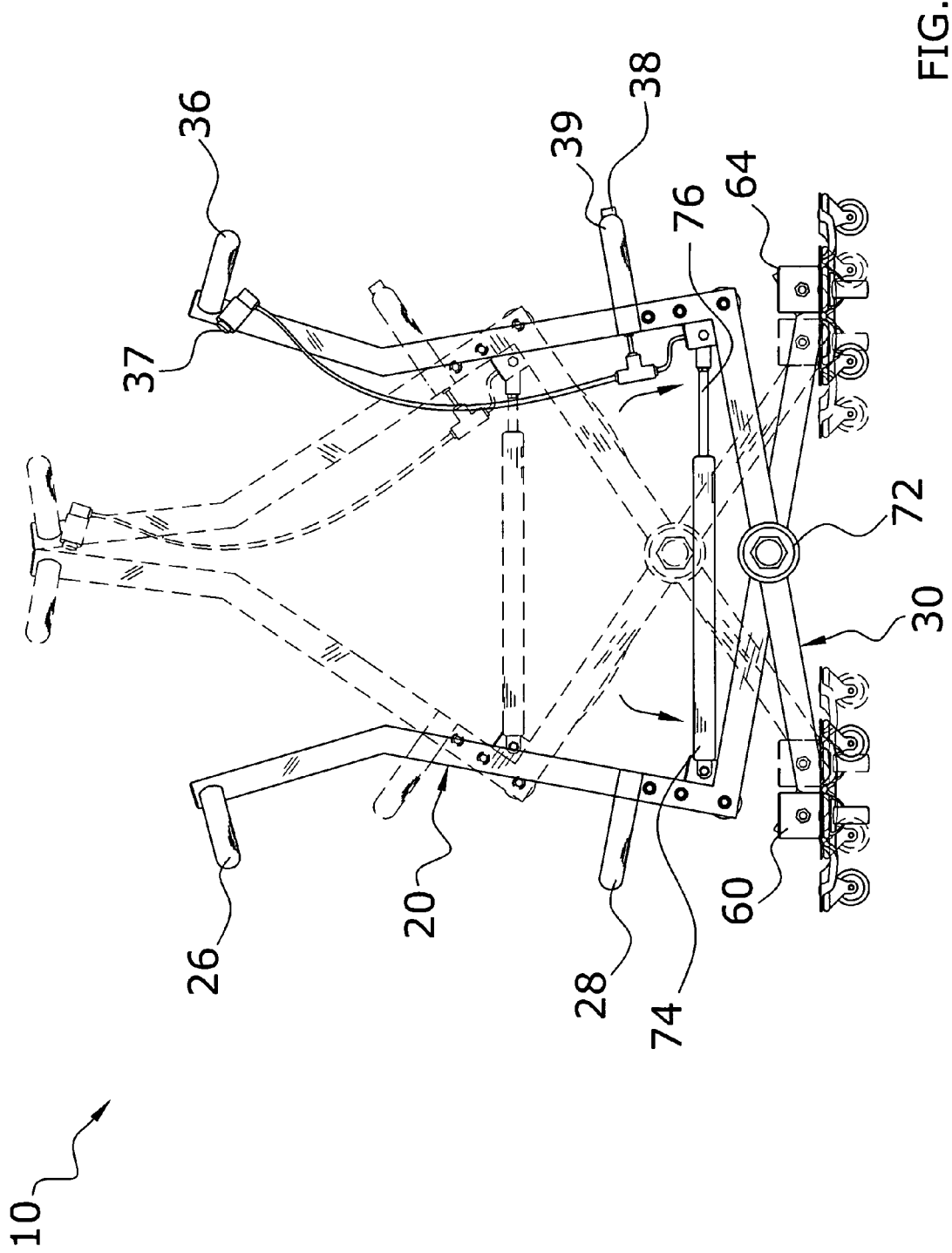
FIG. 16 is a front view of an alternate embodiment of the present invention moving from a fully raised position to a lowered position.

The bias unit 74 is in a relaxed state and the rod member 76 is fully retracted when the wheel lift system 10 is in a fully raised position, as shown in FIG. 15. By activating one or more release members 37, 39, and pushing down on the first handle 20 and the second handle 30, the rod member 76 of the bias unit 74 extends out. This adjusts the wheel lift system 10 from a raised position to a lowered position by pushing outwardly on the second arm, as shown in FIG. 16.

G. Operation of Invention

Figure 5:
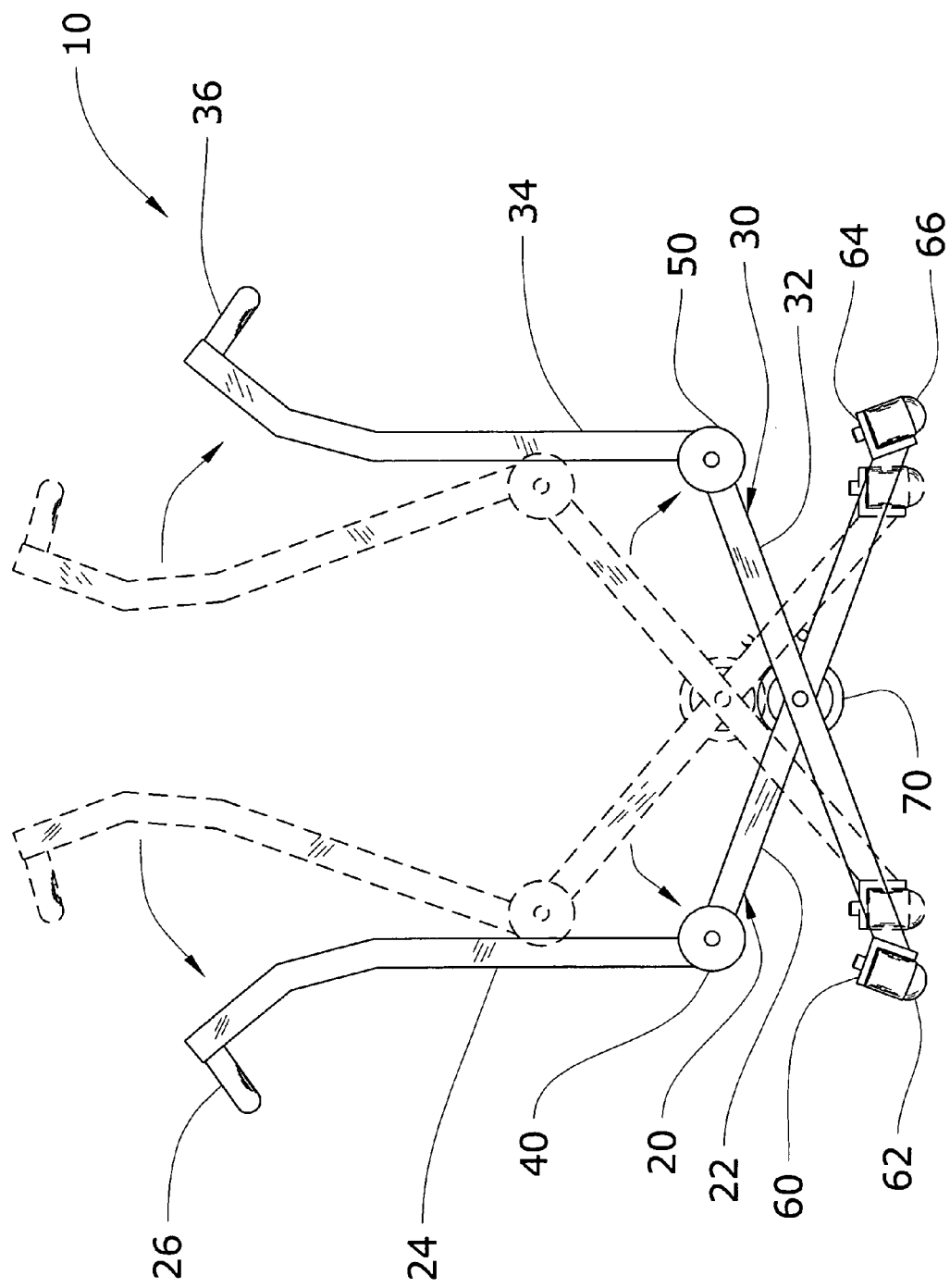
FIG. 5 is a front view of the present invention in the lowered position.
Figure 6:
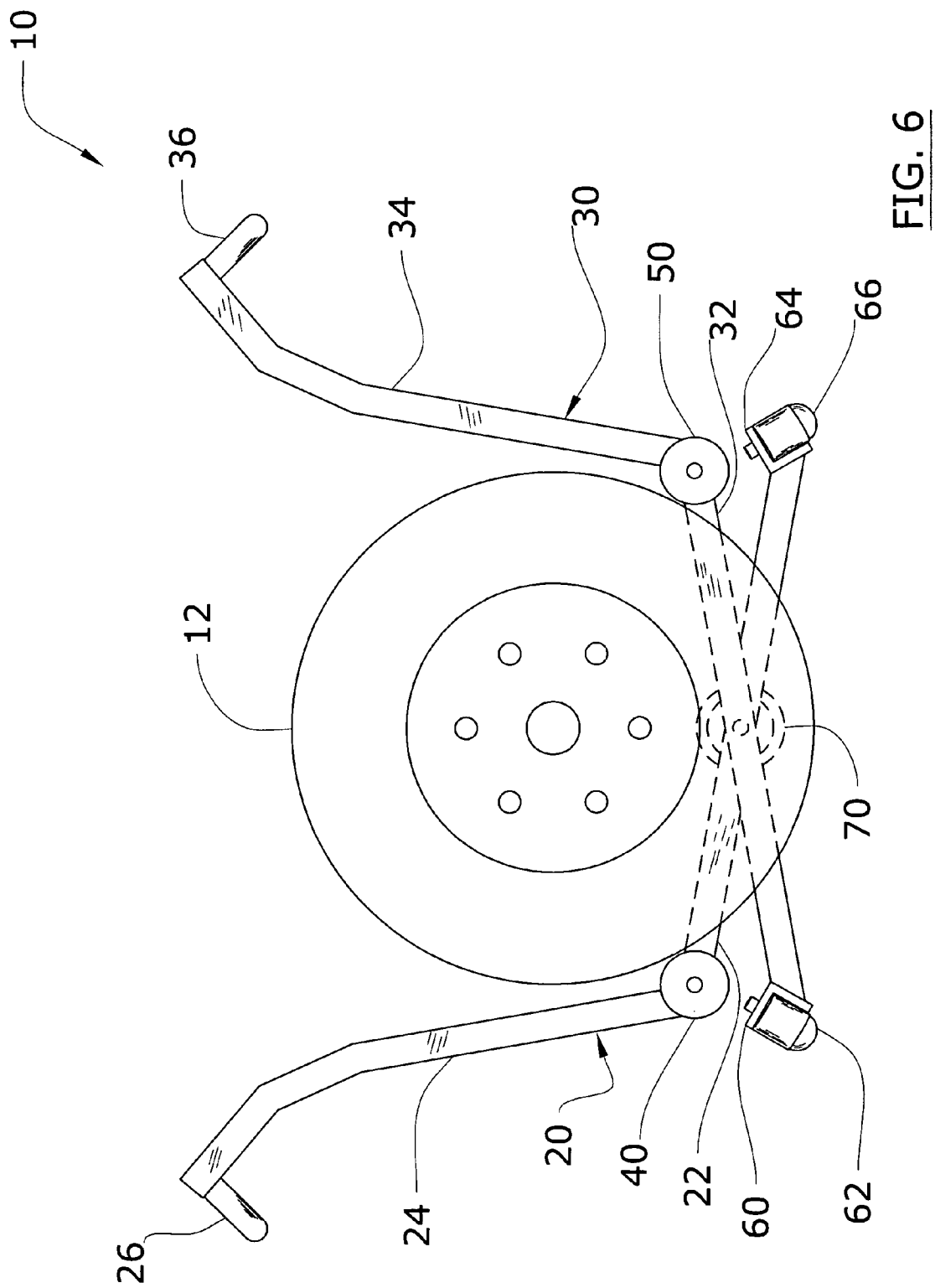
FIG. 6 is a front view of the present invention in the lowered position supporting a wheel.

In operation, the user lowers the supports 40, 50 by pushing down on the bias member 70 with the user's foot or other location as shown in FIGS. 5 and 6 of the drawings. The user then positions the device so that the supports 40, 50 are under the lower periphery of the wheel and tire 12 as shown in FIG. 6 of the drawings. The user is then able to position the wheel and tire 12 near a wheel hub that the user wants to attach the wheel and tire 12 to. By manipulating the handles and allowing the bias member 70 to assist in the elevation of the wheel and tire 12, the arms 20, 30 are caused to rotate opposite of one another causing the supports 40, 50 along with the supported wheel and tire 12 to effectively be raised as shown in FIG. 7 of the drawings. The user is able to maneuver the position of the wheel and tire 12 with the wheels 62, 66 along with adjusting the vertical position by adjusting the force applied to the wheel and tire 12 by the user's hands. After the wheel and tire 12 is properly aligned vertically, the wheel and tire 12 is rotated on the supports 40, 50 to align the lug nut openings. The wheel and tire 12 is then attached utilizing conventional fasteners. After the wheel and tire 12 has been fully or partially attached to the wheel hub, the present invention is lowered and removed from beneath the wheel and tire 12 for use upon another wheel and tire 12.

i. Operation of Alternative Embodiment of Invention

In operation, the user lowers the supports 40, 50 by engaging the first release member 39 and pushing downwardly on the first handle 20 and the second handle 30 until the wheel lift system 10 is in a fully lowered position. The user may then releases the first release member 37, locking the wheel lift system in place 10. Then, the wheel lift system 10 is positioned so that the supports 40, 50 are under the lower periphery of the wheel and tire 12, as shown in FIG. 13 of the drawings.

The user then engages the first release member 37 and simultaneously lifts up on the first handle 20 and the second handle 30 until the center of the wheel and tire 12 is above the center of a wheel hub. The first release member 37 may now be disengaged, simultaneously locking the bias unit 74 and the wheel lift system 10 in place. The user is then able to position the wheel and tire 12 near the wheel hub that the user wants to attach the wheel and tire 12.

Now, the user may position themselves to comfortably grasp the first lower handle 28 and the second lower handle 38. The user may now engage the second release member 39, allowing the rod member 76 to extend from the bias unit 74 and the wheel and tire 12 to lower. The force of the wheel and tire 12 pushing downward overcomes the force of the bias unit 74 pushing upward, allowing the wheel lift system 10 to lower. Once the wheel and tire 12 are at an attachable height location, the second release member 39 may be disengaged, re-locking bias unit 74 and wheel lift system 10 in place.

The wheel lift system 10 may now be rolled into place and the wheel and tire 12 attached to the wheel hub using conventional attachments. The wheel and lift system 10 is now rolled safely away from the wheel hub. The first release member 37 is engaged bringing the wheel and lift system 10 to a fully raised state and putting the bias unit 74 in a relaxed state.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A wheel lift system, comprising:
   a frame comprising a first arm and a second arm pivotally attached to said first arm at a pivot point in a crossing manner;
   a first support extending from said first arm, said first arm including a first lower segment extending downwardly from said first support for supporting said wheel lift system, and a first upper segment extending upwardly from said first support for maneuvering said wheel lift system;
   a second support extending from said second arm, said second arm including a second lower segment extending downwardly from said second support for supporting said wheel lift system, and a second upper segment extending upwardly from said second support for maneuvering said wheel lift system, wherein said first support and said second support are capable of supporting a wheel and tire; and
   a bias unit attached to said first arm and said second arm for providing a biased force to assist in maintaining elevation of said wheel and tire, wherein said bias unit is comprised of a locking gas spring, wherein said locking gas spring includes a rod member, wherein said bias unit is coupled to at least one release member.

2. The wheel lift system of claim 1, a plurality of wheels attached to a lower end of said first arm and said second arm.

3. The wheel lift system of claim 1, including a first base attached to a lower end of said first arm, a second base attached to a lower end of said second arm, a plurality of first wheels attached to said first base, and a plurality of second wheels attached to said second base.

4. The wheel lift system of claim 3, wherein said first wheels and said second wheels are comprised of caster wheels.

5. The wheel lift system of claim 4, wherein said first wheels and said second wheels consist of a three caster wheel structure.

6. The wheel lift system of claim 1, wherein said bias unit is attached to said first arm and said rod member is attached to said second arm, wherein extension or retraction of said rod member respectively pushes or pulls out said second arm, controlling elevation of said wheel lift system.

7. The wheel lift system of claim 1, wherein said at least one release member, when activated, allows at least one of gas or oil to flow through said bias unit, allowing said rod member to extend from said bias unit or protrude into said bias unit.

8. The wheel lift system of claim 1, wherein said first arm and said second arm form an X-shaped structure.

9. The wheel lift system of claim 8, wherein said first arm and said second are pivotally attached to a pivot member.

10. The wheel lift system of claim 1, wherein said first support and said second support are substantially parallel to one another.

11. The wheel lift system of claim 10, wherein said first support and said second support extend substantially transversely from said first arm and said second arm respectively.

12. The wheel lift system of claim 1, wherein said first upper segment includes a first handle and said second upper segment includes a second handle.

13. The wheel lift system of claim 12, wherein said first handle is attached to an upper portion of said first upper segment, a first lower handle is attached to a lower portion of said first upper segment, said second handle is attached to an upper portion of said second upper segment and a second lower handle is attached to a lower portion of said second upper segment.

14. The wheel lift system of claim 13, wherein said at least one release member is positioned proximate to at least one of said first handle and said first lower handle.

15. The wheel lift system of claim 1, wherein first support and said second support are comprised of elongated rollers.

16. The wheel lift system of claim 1, wherein said at least one release member is attached centrally on said frame.

17. A wheel lift system, comprising:
   a frame comprising a first arm and a second arm pivotally attached to said first arm at a pivot member in a crossing manner forming an X-shaped structure, wherein said first arm is comprised of a first lower segment and a first upper segment and wherein said second arm is comprised of a second lower segment and a second upper segment;
   a first handle extending from said first upper segment;
   a first lower handle extending from said first upper segment;
   a second handle extending from said second upper segment;
   a second lower handle extending from said second upper segment;
   a first support extending from said first arm, said first lower segment extending downwardly from said first support for supporting said wheel lift system, said first upper segment extending upwardly from said first support for maneuvering said wheel lift system;
   a second support extending from said second arm, said second lower segment extending downwardly from said second support for supporting said wheel lift system, said second upper segment extending upwardly from said second support for maneuvering said wheel lift system, wherein said first support and said second support are substantially parallel to one another, and wherein said first support and said second support extend substantially transversely from said first arm and said second arm respectively for removably supporting a tire;

a first base attached to a lower end of said first arm;

a second base attached to a lower end of said second arm;

a plurality of first wheels attached to said first base;

a plurality of second wheels attached to said second base, wherein said first wheels and said second wheels are comprised of caster wheels; and a bias unit including a rod member wherein said bias unit is attached to said first arm and said rod member is attached to said second arm for providing a biased force to assist in maintaining elevation of a wheel and tire, wherein said bias unit is comprised of a locking gas spring, wherein said bias unit is coupled to at least one release member.

18. The wheel lift system of claim 17, wherein said at least one release member, when activated, allows at least one of gas or oil to flow through said bias unit, allowing said rod member to extend from said bias unit or protrude into said bias unit respectively lowering said wheel lift system or elevating said wheel lift system.

19. The wheel lift system of claim 17, wherein said first wheels and said second wheels consist of a three caster wheel structure.

20. The wheel lift system of claim 17, wherein said at least one release member is attached centrally on said frame.

21. A wheel lift system, comprising:

a frame comprising a first arm and a second arm pivotally attached to said first arm at a pivot point in a crossing manner;

a first support extending from said first arm, said first arm including a lower segment extending downwardly from said first support for supporting said wheel lift system, and an upper segment extending upwardly from said first support for maneuvering said wheel lift system;

a second support extending from said second arm, said second arm including a lower segment extending downwardly from said second support for supporting said wheel lift system, and an upper segment extending upwardly from said second support for maneuvering said wheel lift system, wherein said first support and said second support are capable of supporting a wheel and tire; and a bias unit attached to said first arm and said second arm for providing a biased force to assist in maintaining elevation of said wheel and tire, wherein said bias unit is comprised of a locking gas spring, wherein said locking gas spring includes a rod member, wherein said bias unit is attached to a hydraulic hose, wherein said hydraulic hose includes a first release member attached to an upper portion of said frame, wherein said hydraulic hose includes a second release member attached to said frame between said first release member and a lower end of said frame; wherein said first release member or said second release member, when activated, allows at least one of gas or oil to flow through said bias unit, allowing said rod member to extend from said bias unit or protrude into said bias unit.

* * * * *